US007258001B2

(12) United States Patent
Kunter et al.

(10) Patent No.: US 7,258,001 B2
(45) Date of Patent: Aug. 21, 2007

(54) VENTILATION MAST MONITORING SYSTEM FOR FILLING STATIONS

(75) Inventors: Stefan Kunter, Hamburg (DE); Wolfgang Schrittenlacher, Hamburg (DE)

(73) Assignee: Fafnir GmbH, Hamburg (DE)

(*) Notice: Subject to any disclaimer, the term of this patent is extended or adjusted under 35 U.S.C. 154(b) by 234 days.

(21) Appl. No.: 11/059,502

(22) Filed: Feb. 17, 2005

(65) Prior Publication Data

US 2005/0188776 A1 Sep. 1, 2005

(30) Foreign Application Priority Data

Feb. 27, 2004 (DE) ..................... 10 2004 009 643

(51) Int. Cl.
*G01F 15/02* (2006.01)

(52) U.S. Cl. ........................................................ 73/198

(58) Field of Classification Search ............... 73/865.8, 73/865.9, 25.01, 25.03, 25.05, 198, 204.11–204.27; 222/23, 154; 141/94

See application file for complete search history.

(56) References Cited

U.S. PATENT DOCUMENTS

| | | | | |
|---|---|---|---|---|
| 5,040,577 | A | 8/1991 | Pope | |
| 5,156,199 | A | 10/1992 | Hartsell et al. | |
| 5,320,077 | A * | 6/1994 | Kamiya et al. | 123/339.11 |
| 5,782,275 | A | 7/1998 | Hartsell et al. | |
| 5,857,500 | A | 1/1999 | Payne et al. | |
| 6,026,866 | A | 2/2000 | Nanaji | |
| 6,240,982 | B1 * | 6/2001 | Bonne | 141/59 |
| 6,244,310 | B1 | 6/2001 | Rowland et al. | |
| 6,276,310 | B1 * | 8/2001 | Backes et al. | 123/1 A |
| 6,325,112 | B1 | 12/2001 | Nanaji | |
| 6,336,479 | B1 | 1/2002 | Nanaji | |
| 6,357,493 | B1 | 3/2002 | Shermer et al. | |
| 6,386,246 | B2 | 5/2002 | Pope et al. | |
| 6,460,579 | B2 | 10/2002 | Nanaji | |
| 6,499,516 | B2 | 12/2002 | Pope et al. | |
| 6,532,999 | B2 | 3/2003 | Pope et al. | |
| 6,644,360 | B1 | 11/2003 | Sobota et al. | |

FOREIGN PATENT DOCUMENTS

| | | |
|---|---|---|
| EP | 1 035 071 A1 | 3/1999 |
| EP | 0 982 263 A1 | 8/1999 |
| EP | 0 985 634 A1 | 9/1999 |
| EP | 0 985 634 B1 | 9/1999 |
| EP | 1 127 837 A2 | 2/2001 |

* cited by examiner

*Primary Examiner*—Robert Raevis
(74) *Attorney, Agent, or Firm*—Nixon & Vanderhye P.C.

(57) ABSTRACT

A ventilation-mast monitoring system for filling stations contains a thermal through-flow measuring device (30) and a hydrocarbon-measuring device (30). The thermal through-flow-measuring device (30) has a heating device and a temperature sensor which is located in the flow path and reacts to the temperature of the heating device, and is configured to sense the gas volume flow escaping from a reservoir tank (1) via a ventilation mast (4) of the reservoir tank (1) of a filling station or entering the reservoir tank (1). The hydrocarbon-measuring device (30) is configured to sense the direction of the gas volume flow escaping from or entering the reservoir tank (1) via the ventilation mast (4). A control device which is configured to receive and to process measuring signals emitted by measuring devices of the system is preferably provided as a further system component.

16 Claims, 1 Drawing Sheet

VENTILATION MAST MONITORING SYSTEM FOR FILLING STATIONS

BACKGROUND OF THE INVENTION

The invention relates to a ventilation-mast monitoring system for filling stations.

At filling stations, the fuels which are intended for refuelling motor vehicles are generally stored in reservoir tanks which are buried in the ground. Such a reservoir tank is connected to a ventilation mast which projects out of the ground and by means of which, depending on the pressure conditions prevailing in the reservoir tank, gas (in particular a fuel/air mixture) can escape from the reservoir tank or air can enter the reservoir tank. The pressure in the reservoir tank can vary, for example if the fuel cools to the temperature of the ground after the reservoir tank has been filled. Also, pressure fluctuations occur in the reservoir tank if, when refuelling a motor vehicle, the fuel feed rate does not correspond to the gas feed rate of the gas recirculation system. The cause of this may be, for example, faults in the gas recirculation system or refuelling processes in motor vehicles in which fuel vapours are retained with on-board means (ORVR). Since the pressure in a reservoir tank can increase and decrease, and as little fuel gas or vapour as possible should be allowed to escape into the environment, ventilation masts are frequently provided in their upper end region with a throttle or a gas pendulum valve. A throttle has a high flow resistance and therefore reduces the gas volume flow through the ventilation mast while a gas pendulum valve acts as an overpressure valve in both directions so that gas can flow through the ventilation mast only if an overpressure in the reservoir tank exceeds a predefined value or an underpressure drops below a predefined value.

A ventilation-mast monitoring system can be used to acquire an overview of the pressure conditions in a reservoir tank of a filling station and, if appropriate, to adjust the pressure. Such a system is described in EP 0 985 634 B1. In said system, the ventilation mast is provided with a gas pendulum valve, a non-return valve, a through-flow meter and a mass spectrometer serving as a hydrocarbon sensor. The measured data is processed in a controller and makes it possible, in particular, to recognize an ORVR vehicle when refuelling and to set the gas recirculation accordingly.

The through-flow meter of the previously known ventilation-mast monitoring system is a conventional device which is limited in its measurement dynamics and, for example, can no longer sense quantitatively if a large quantity of gas escapes through the ventilation mast while the reservoir tank is being filled, because the gas pendulum hose, which serves to recirculate the gas expelled out of the reservoir tank during refuelling into the tanker vehicle, has inadvertently not been connected.

SUMMARY OF THE INVENTION

The object of the invention is to improve the previously known ventilation-mast monitoring system for filling stations.

The ventilation-mast monitoring system according to the invention for filling stations contains a thermal through-flow measuring device which has a heating device and a temperature sensor which is located in the flow path and reacts to the temperature of the heating device. This through-flow measuring device is configured to sense the gas volume flow escaping from or entering into a reservoir tank of the filling station via the ventilation mast of the reservoir tank. In addition, a hydrocarbon-measuring device is provided in the system, said device being configured to sense the direction of the gas volume flow escaping from or entering into the reservoir tank via the ventilation mast.

A thermal through-flow measuring device which is suitable for the ventilation-mast monitoring system according to the invention is known from DE 199 13 968 A1. The measuring principle is based on the fact that the temperature sensor which is located in the range of influence of the heating device is cooled better, for a given heating power, with a large gas volume flow (i.e., with a larger flow rate) than with a small gas volume flow, and accordingly indicates a correspondingly lower temperature. In another circuit design, the temperature difference between the temperature sensor and the ambient temperature is kept constant using an electronic control system and the power supplied to the heating device is sensed; when the gas volume flow rises, the heating power must also rise in order to keep the temperature difference at the preselected value. Thus, the power which is supplied to the heating device is a measure of the through-flow to be measured.

Such a thermal through-flow measuring device has large measurement dynamics, i.e. it is capable of quantitatively sensing a gas volume flow which can vary by several orders of magnitude. The through-flow measuring device preferably has measurement dynamics of at least 2 l/min to 1200 l/min; however, the measurement dynamics can also be even larger. High gas volume flows of the order of magnitude of 1000 l/min occur principally if the gas pendulum hose has not been connected when filling the reservoir tank, as explained above.

In order to increase the measuring accuracy, at least two measuring ranges are assigned to the through-flow measuring device. These measuring ranges may be selected by predefining a fixed temperature difference between the temperature of the temperature sensor and the ambient temperature, with the power which is respectively fed to the heating device being a measure of the through flow to be measured. In this context, a higher temperature difference is selected to measure small gas volume flows than to measure large gas volume flows so that there is generally not an excessively large difference between the power levels supplied to the heating device in the two measuring ranges. The through-flow measuring device can be calibrated by standardization measurements.

In one preferred embodiment of the ventilation-mast monitoring system according to the invention, the hydrocarbon-measuring device has a thermal-conductivity measuring cell. The thermal-conductivity measuring cell preferably has a measuring cell housing, a heating device and a temperature sensor which reacts to the temperature of this heating device. The measuring cell housing is provided with at least one opening which is configured for gas to enter into the measuring cell housing from the gas flowing through the ventilation mast.

One preferred form of the thermal-conductivity measuring cell is also known from DE 199 13 968 A1. In principle this thermal-conductivity measuring cell is of similar construction to the through-flow measuring device. The temperature sensor, however, does not lie in the flow path of the gas flowing through the ventilation mast but rather communicates to this flow path via an opening so that the gas can slowly enter into the measuring cell housing without in the process conducting heat through convection. The temperature sensor is therefore cooled essentially by the thermal conductivity of the gas in the measuring cell housing. This permits the thermal conductivity of the gas to be determined by means of the temperature of the temperature sensor or the heating power, as is explained in more detail in DE 199 13 968 A1. In a gas mixture which is composed of hydrocarbons and air it is possible to infer the concentration of the hydrocarbons from the measured thermal conductivity.

The preferred hydrocarbon-measuring device of the system according to the invention therefore permits quantitative determination of the hydrocarbon concentration in the gas mixture flowing through the ventilation mast. Moreover, the measuring signals which are emitted by the hydrocarbon-measuring device permit definitive conclusions to be drawn about the direction of the flow in the ventilation mast: if the hydrocarbon concentration is high, that is to say above a predefined limiting value (threshold value), the gas must originate from the reservoir tank and accordingly be flowing into the surroundings. If, on the other hand, the hydrocarbon concentration is low, the gas must essentially be air which is sucked in to the reservoir tank by an underpressure. In order to detect the direction of the flow through the ventilation mast as quickly as possible, the hydrocarbon-measuring device should be installed as close as possible to the top end of the ventilation mast.

The thermal through-flow measuring device and the preferred hydrocarbon-measuring device of the system according to the invention have a simple basic design, operate precisely and are cost-effective.

In one preferred embodiment, the system also has a pressure-measuring device which is configured to sense the pressure in the reservoir tank. If the pressure is known, the emission of hydrocarbons out of the reservoir tank can be calculated using the measured values for the gas volume flow and the hydrocarbon concentration (see below). The measurement of pressure fluctuations in the reservoir tank can also be advantageous for the analysis of refuelling processes and the control of the gas recirculation. Such relatively small pressure fluctuations occur in particular if a gas pendulum valve on the ventilation mast does not yet respond and accordingly there is still no gas flowing through the ventilation mast.

In addition, the system can have a temperature-measuring device which is configured to sense the temperature in the reservoir tank. The temperature in the reservoir tank determines the vapour pressure of the fuel, and accordingly the hydrocarbon concentration in the gas phase above the fuel level of the reservoir tank by means of the vapour pressure curve. If this hydrocarbon concentration is known, a suitable limiting value can be predefined for the hydrocarbon concentration, which value is necessary to determine the direction of the gas volume flow passing through the ventilation mast, as explained above. The vapour pressure curves of summer fuel and winter fuel are different, which can be taken into account during an evaluation in a control device.

In one preferred embodiment, the system according to the invention has a control device which is configured to receive and process measuring signals emitted by measuring devices of the system. This control device is preferably a separate component which contains a computer and/or can be connected to a computer. In addition, the control electronics of connected measuring devices (for example the thermal through-flow measuring device) can be connected to the control device to form one structural unit. It is, however, also possible to accommodate the respective control electronics in the vicinity of the individual measuring devices or to integrate them into these measuring devices.

Control programs, regulating programs and evaluation programs preferably run in the control device or the assigned computer in order to operate the individual measuring devices and to evaluate the measured data received therefrom.

For example, the control device can be configured in such a way that a gas volume flow sensed by the through-flow measuring device is processed as entering into the reservoir tank if the hydrocarbon concentration sensed by the hydrocarbon measuring device drops below a predefined limiting value. This limiting value is preferably defined by means of the temperature in the reservoir tank, as has already been explained above.

Generally, large gas volume flows do not pass through the ventilation mast so that it is appropriate to operate the through-flow measuring device in a measuring range with high sensitivity in order to permit good measuring accuracy, but to switch over to a measuring range with low sensitivity when the gas volume flow rises above a predefined value. High gas volume flows can occur, in particular, owing to faults when the reservoir tank is filled, as has already been described above.

The control device can also be configured to activate the hydrocarbon-measuring device if the gas volume flow lies above a predefined threshold value. In this way it is possible to avoid dynamic effects as a result of undesired heating.

In addition, the control device can evaluate measurement signals emitted by the pressure-measuring device. As a result it is possible, for example, to detect at an early point an overpressure which builds up in the reservoir tank and to draw definitive conclusions about the behaviour when the reservoir tank is filled. A further application is the detection of an excessively low pressure in the reservoir tank owing to frequent ORVR refuelling operations in which the gas recirculation is switched off.

Measurement signals for the contents (filling level) of the reservoir tank are frequently available, said signals having been acquired by an independent filling-level measuring device. Such a filling-level measuring device can, however, also be a component of the system. The control device is preferably configured to evaluate and process measurement signals emitted by the filling-level measuring device, because said signals permit conclusions to be drawn about the causes of changes in the pressure. For example, the filling level drops when fuel is removed, but very slowly. In contrast, when the reservoir tank is filled, the filling level rises comparatively quickly so that there is generally a relatively pronounced rise in pressure in the reservoir tank owing to a certain delay in the pressure equalization via the gas pendulum hose of the tanker vehicle. The measurement of the tank contents permits a difference to be made between this rise in pressure and the case in which the gas recirculation has an excessively high feed power and as a result an additional pressure builds up in the reservoir tank. In the Californian regulations, the permitted pressure limits in the reservoir tank are different, depending on whether a normal refuelling operation is being carried out or whether the reservoir tank is being filled; and even for this the information acquired by measuring the tank contents is useful.

The control device can also process the measurement signals of the through-flow measuring device, the hydrocarbon-measuring device and optionally the pressure-measuring device in order to determine the emission of hydrocarbons from the reservoir tank. This is because the instantaneous emission of hydrocarbons from the reservoir tank per time unit can be calculated from the product of the hydrocarbon concentration, the overall pressure and the volume flow by means of the instantaneous measured values. By integrating over time, the overall emissions are obtained, for example the loss of hydrocarbons when the gas pendulum hose is not connected during a process of filling the reservoir tank. Instead of the measured pressure it is also possible to use the atmospheric pressure as an approximated value, but this reduces the accuracy.

The control device is preferably configured to emit an alarm signal if at least one value determined from measurement signals of the through-flow measuring device, of the hydrocarbon-measuring device and optionally of the pressure-measuring device lies outside predefined fault limits. Limiting values, for example for permissible emissions, are generally predefined by legislators. The measurement signals can be converted and recalculated in the control device or an associated computer, if appropriate using further variables or parameters (for example standardization parameters), so that a comparison with a respective limiting value becomes possible.

BRIEF DESCRIPTION OF THE DRAWINGS

The invention is illustrated further below with reference to a drawing, in which.

DETAILED DISCUSSION OF PREFERRED EMBODIMENTS

Figure 1:
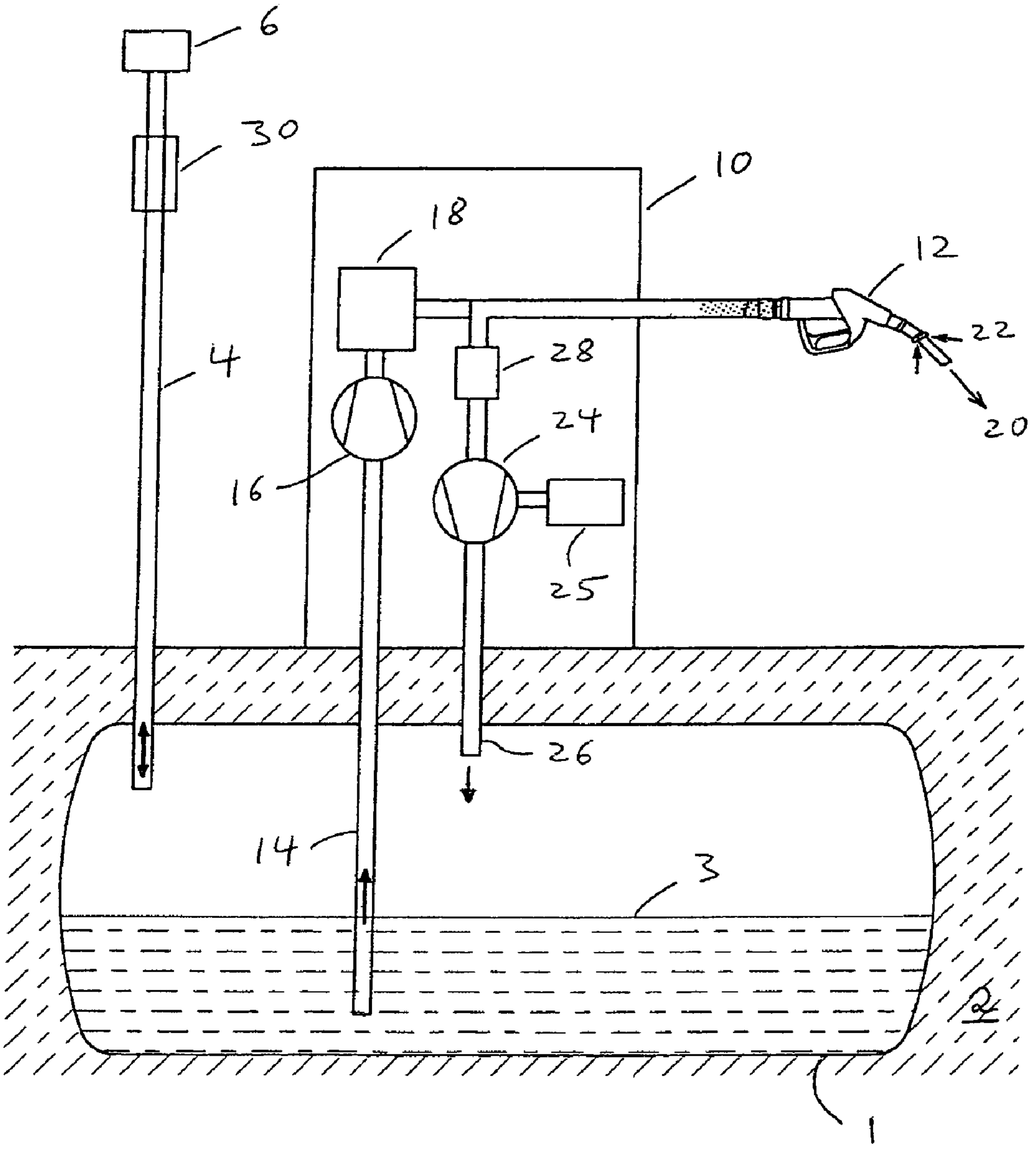
FIG. 1 shows a schematic representation of a reservoir tank of a filling station with a ventilation mast and a petrol pump with gas recirculation.

FIG. 1 is a schematic illustration of the gas recirculation system of a filling station.

Liquid fuel is stored in a reservoir tank 1 which is buried in the ground 2. The fuel level is indicated by 3.

Gaseous hydrocarbons or a mixture of gaseous hydrocarbons and air are located above the fuel level 3. For this reason, the reservoir tank 1 can be pressurized, but an underpressure may also be generated in it. A pressure equalization is carried out by means of a ventilation mast 4. A plurality of reservoir tanks are generally connected to one another at filling stations by means of a connecting line and this connecting line is connected to the ventilation mast so that one ventilation mast is sufficient for a plurality of reservoir tanks. However, for the sake of simplicity, only one ventilation tank 1 with the ventilation mast 4 is shown in FIG. 1.

The ventilation mast 4 is provided at its end with its gas pendulum valve 6, which responds when a predefined overpressure in the reservoir tank 1 is exceeded so that gas can escape from the reservoir tank 1, but it also allows air to enter into the reservoir tank 1 as soon as the pressure drops below a predefined under-pressure. The pressure in the reservoir tank 1 can therefore vary only within predefined limits.

Instead of the gas pendulum valve 6, the ventilation mast 4 can also have a throttle or simply be provided with an opening in its upper end region.

A motor vehicle is refuelled via a petrol pump 10, a filling valve 12 being inserted into the tank filler neck of the motor vehicle. In this context, the fuel from the reservoir tank 1 is transported via a line 14 using a fuel pump 16. The quantity of liquid which is fed is registered by a counter 18. The fuel escapes from the filling valve 12 at 20 and flows into the tank of the motor vehicle.

The gas which is expelled when the tank of the motor vehicle is filled is sucked in via a gas intake opening 22 and is fed into the reservoir tank 1 via a line 26 by means of a gas pump 24 which is driven by a drive motor 25.

The quantity of gas which is supplied is monitored by means of a gas-flow monitoring means 28 so that when necessary, for example, the drive motor 25 can be actuated in order to adapt the delivery capacity of the gas pump 24 to the quantity of fuel delivered per time unit.

As already mentioned, the pressure in the reservoir tank 1 is not constant when the system is operating but rather may be subject to fluctuations. A cause of such fluctuations may be, for example, changes to the temperature of the fuel in the reservoir tank 1, defects in the gas recirculation or refuelling operations of ORVR vehicles. When the gas pendulum valve 6 responds, gas escapes (essentially hydrocarbons or a hydrocarbon/air mixture) from the reservoir tank 1, or gas (essentially air) enters into the reservoir tank 1. In order to acquire an overview of the gas flow through the ventilation mast 4 and to be able to carry out monitoring, the ventilation mast 4 is provided with a ventilation-mast monitoring device 30.

The ventilation-mast monitoring device 30 is located near to the upper end of the ventilation mast 4. The ventilation-mast monitoring device 30 contains a thermal through-flow measuring device in a common housing, which device senses the gas volume flow escaping from the reservoir tank 1 or entering into the reservoir tank 1, and a hydrocarbon-measuring device which is capable of sensing the hydrocarbon concentration in the gas mixture flowing through the ventilation mast 4. Together with a control device, which is not shown in FIG. 1, the ventilation-mast monitoring device 30 forms a ventilation-mast monitoring system.

In the exemplary embodiment, the thermal through-flow measuring device has the design as explained at the beginning and described in DE 199 13 968 A1.

In the exemplary embodiment, the hydrocarbon-measuring device has a thermal-conductivity measuring cell whose principle has also been explained at the beginning. DE 199 13 968 A1 also contains a description of this thermal-conductivity measuring cell.

The method of operation of the ventilation-mast monitoring system with the ventilation-mast monitoring device 30 and the associated control device as well as the numerous possibilities for monitoring methods which can be carried out with it have already been explained further above. In this context, it is also possible to process measurement signals of a pressure-measuring device in order to sense the pressure in the reservoir tank 1, a temperature-measuring device for sensing the temperature in the reservoir tank 1 and a filling-level-measuring device for sensing the filling level in the reservoir tank 1 (all not shown in FIG. 1), as described above.

The invention claimed is:

1. Ventilation-mast monitoring system for filling stations, having a thermal through-flow measuring device which has a heating device and a temperature sensor located in the flow path and reacting to the temperature of the heating device and which is configured to sense the gas volume flow which escapes from or enters into a reservoir tank of a filling station via a ventilation mast of the reservoir tank, and having a hydrocarbon measuring device which is configured to sense the direction of the gas volume flow which escapes from or enters into the reservoir tank via the ventilation mast, wherein the through-flow measuring device has a measuring dynamic of at least 2 l/min to 1200 l/min, and wherein to the through-flow measuring device there are assigned at least two measuring ranges which can be selected by predetermining a fixed temperature difference between the temperature of the temperature sensor and the ambient temperature, wherein the power which is respectively fed to the heating device is a measure of the through-flow to be measured.

2. System according to claim 1, wherein the hydrocarbon-measuring device has a thermal-conductivity measuring cell.

3. System according to claim 2, wherein the thermal-conductivity measuring cell has a measuring cell housing, a heating device and a temperature sensor which reacts to the temperature of the heating device, wherein the measuring cell housing has at least one opening which is configured for gas to enter into the measuring cell housing from the gas flowing through the ventilation mast.

4. System according to claim 1, further comprising a pressure-measuring device which is configured to sense the pressure in the reservoir tank.

5. System according to claim 1, further comprising a filling-level-measuring device which is configured to sense the filling level in the reservoir tank.

6. System according to claim 1, further comprising a temperature-measuring device which is configured to sense the temperature in the reservoir tank.

7. System according to claim 1, further comprising a control device which is configured to receive and process measuring signals emitted by measuring devices of the system.

8. System according to claim 7, wherein the control device is configured in such a way that a gas volume flow sensed by the through-flow measuring device is processed as entering the reservoir tank if the hydrocarbon concentration sensed by the hydrocarbon-measuring device drops below a predefined limiting value, wherein the control device is preferably configured to define the limiting value by means of the temperature in the reservoir tank.

9. System according to claim 7, wherein the control device is configured to operate the through-flow-measuring device in a measuring range of high sensitivity, and is configured to switch over to a measuring range with a low sensitivity if there is a rise in the gas volume flow above a predefined value.

10. System according to claim 7, wherein the control device is configured to activate the hydrocarbon measuring device if the gas volume flow lies above a threshold value.

11. System according to claim 7, wherein the control device is configured to evaluate measuring signals which are emitted by a pressure-measuring device configured to sense the pressure in the reservoir tank.

12. System according to claim 7, wherein the control device is configured to evaluate measuring signals emitted by a filling-level-measuring device configured to sense the filling level in the reservoir tank.

13. System according to claim 7, wherein the control device is configured to emit an alarm signal if at least one value which is determined from measuring signals of the through-flow-measuring device and the hydrocarbon-measuring device lies outside predefined error limits.

14. System according to claim 7, wherein the control device is configured to determine the emission of hydrocarbons from the reservoir tank by means of measuring signals which are emitted by the through-flow-measuring device, the hydrocarbon-measuring device and a pressure-measuring device measuring the atmospheric pressure.

15. System according to claim 7, wherein the control device is configured to emit an alarm signal if at least one value which is determined from measuring signals of the through-flow-measuring device, the hydrocarbon-measuring device and a reservoir tank pressure-measuring device lies outside predefined error limits.

16. System according to claim 7, wherein the control device is configured to determine the emission of hydrocarbons from the reservoir tank by means of measuring signals which are emitted by the through-flow-measuring device, the hydrocarbon-measuring device and a reservoir tank pressure-measuring device.

* * * * *